July 1, 1941.　　　C. E. McCOY ET AL　　　2,247,761
ENGRAVING MACHINE
Filed May 10, 1939　　　4 Sheets-Sheet 1
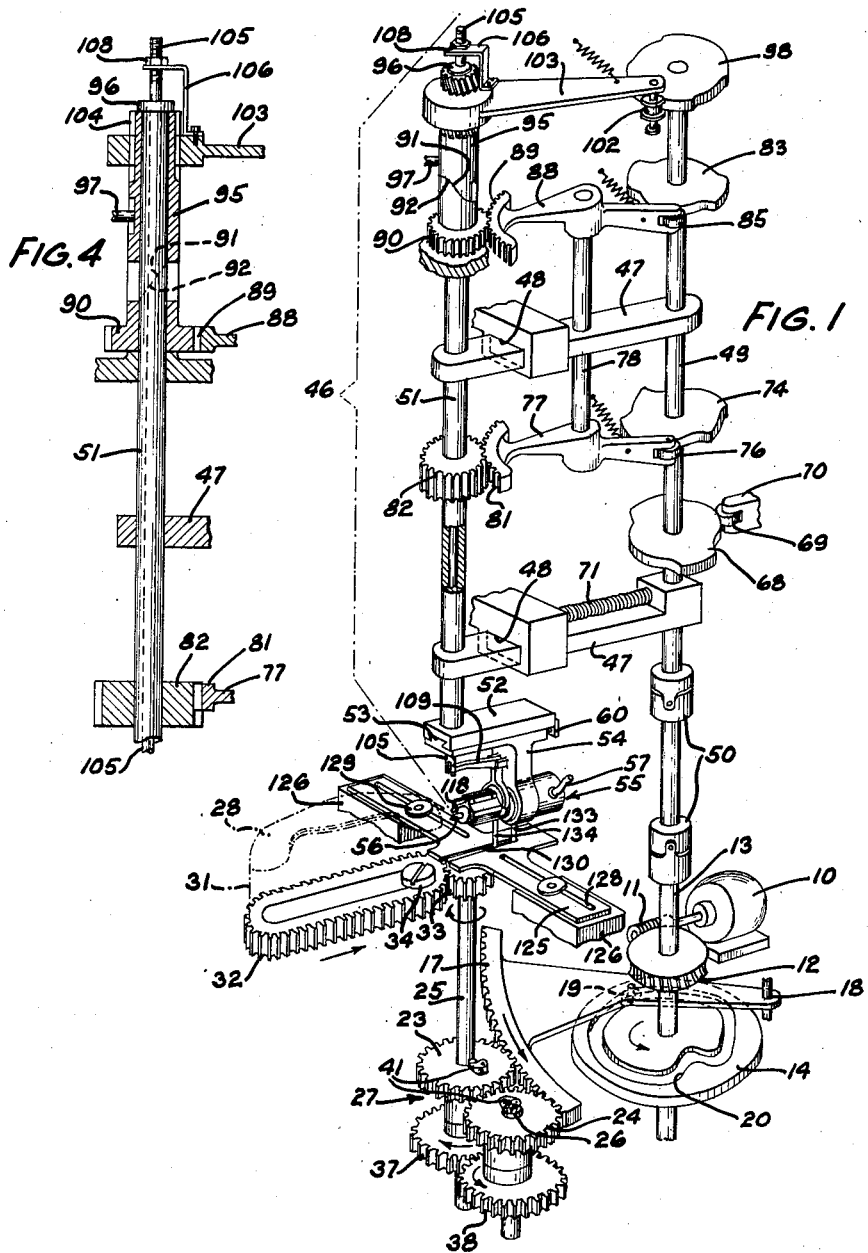
INVENTORS
C.E. McCOY
O.M. NIELSEN
E. OBERT
BY Emery Robinson
ATTORNEY

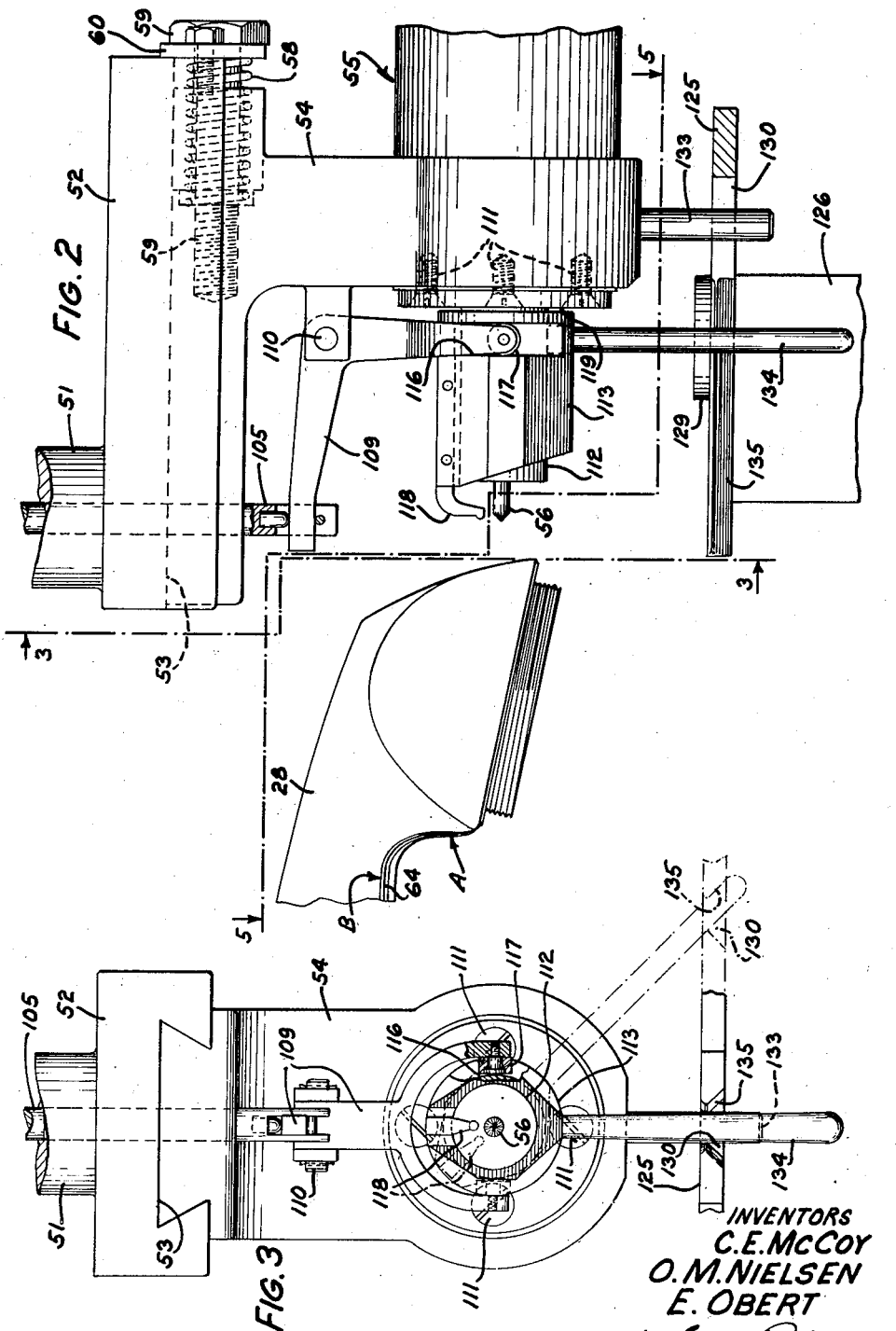

July 1, 1941.                    C. E. McCOY ET AL                    2,247,761
                                 ENGRAVING MACHINE
                            Filed May 10, 1939          4 Sheets-Sheet 3
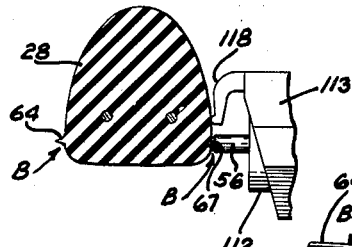
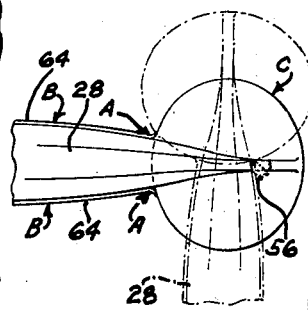
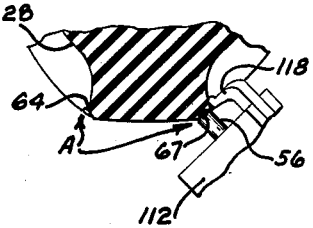
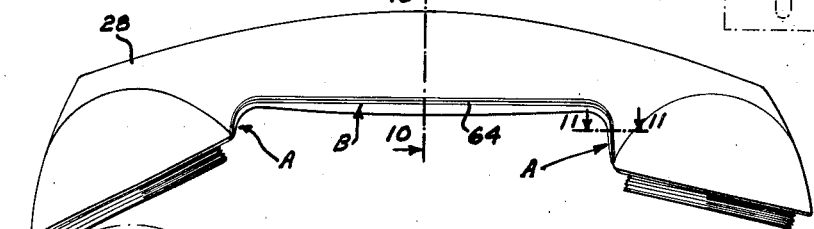
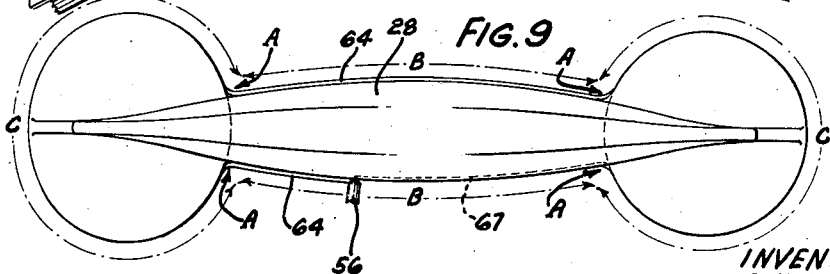
INVENTORS
C. E. McCOY
O. M. NIELSEN
E. OBERT
BY Emery Robinson
ATTORNEY July 1, 1941.  C. E. McCOY ET AL  2,247,761
ENGRAVING MACHINE
Filed May 10, 1939  4 Sheets-Sheet 4
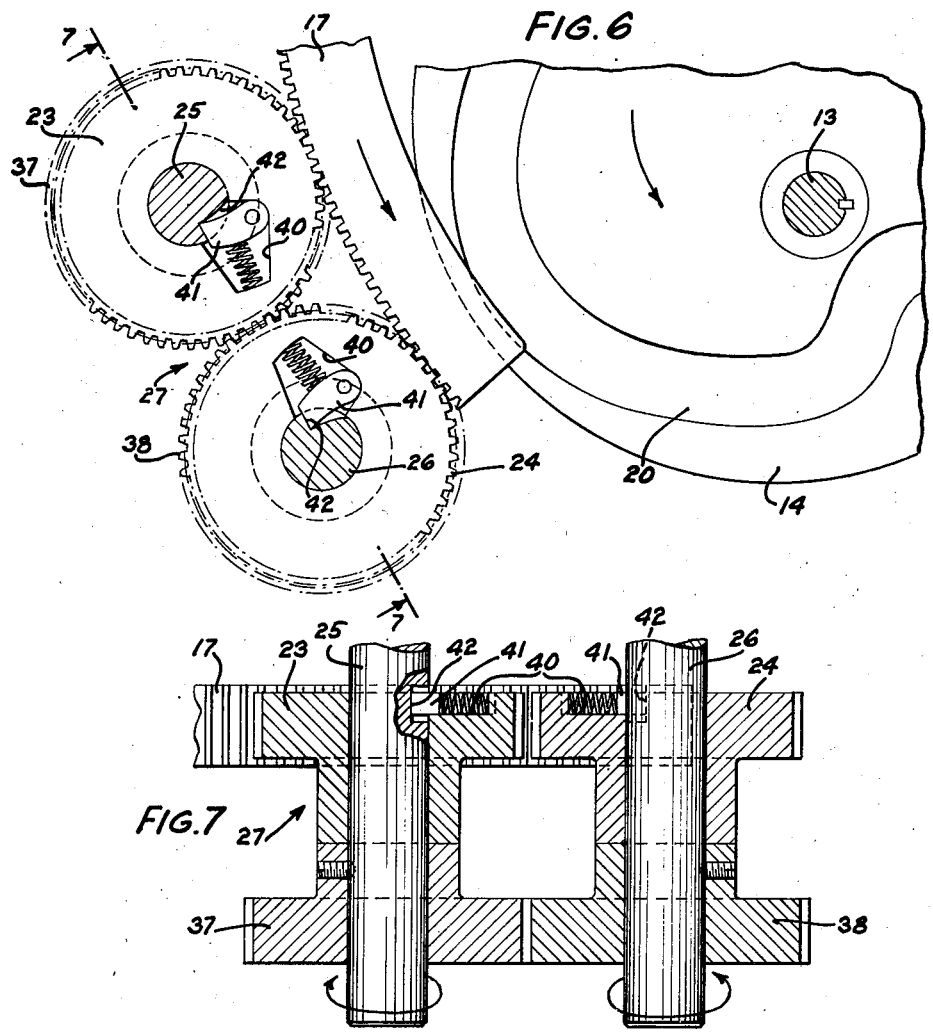
INVENTORS
C. E. McCOY
O. M. NIELSEN
E. OBERT
BY Emery Robinson
ATTORNEY Patented July 1, 1941

2,247,761

UNITED STATES PATENT OFFICE 2,247,761

ENGRAVING MACHINE

Clarence E. McCoy, Western Springs, Oliver M. Nielsen, Chicago, and Edward Obert, Oak Park, Ill., assignors to Western Electric Company, Incorporated, New York, N. Y., a corporation of New York Application May 10, 1939, Serial No. 272,760

5 Claims. (Cl. 90—13)

This invention relates to engraving machines, and more particularly to a machine for forming a groove in the periphery of irregularly shaped molded articles at the molding die parting line, which follows a variable path in a plurality of planes, to remove the overflow material occurring thereat.

In Zelenka Patent 1,904,845, granted April 18, 1933, the difficulties encountered in making a molded article of phenol plastic or similar plastic material in such a way as to provide a finished ornamental appearance at the flash line caused by the molding dies are described. One method of overcoming these difficulties is disclosed in said patent. The present method comprises forming a groove, preferably V-shaped in cross-section, along the flash line of the article for removing the flash or fin without marring the adjacent surfaces. Since the groove is narrow the unpolished surfaces within the groove do not detract from the ornamental appearance of the article which is produced by the polished surfaces of the mold.

An object of the present invention is to provide a practicable and efficient automatic machine for finishing irregularly shaped molded articles wherein the flash or overflow material is removed by engraving a groove of substantially constant width and depth therealong without marring the autogenous finish of the adjacent surfaces.

The invention will be disclosed as applied, for example, to the V-shape grooving of phenol plastic molded telephone handset handles molded in such a manner that flash lines occur along diametrically opposite sides, spaced apart by circular ends where no flash lines occur, the end portions of each flash line extending substantially vertical to the intermediate portion thereof.

In accordance with one embodiment of the invention, a machine is provided in which a cam operated gear ratchet drive is arranged for intermittently revolving and longitudinally moving at a variable speed a telephone handset handle in a single horizontal plane past a continuously rotating high speed end milling cutter. In the machine cycle the cutter is moved vertically to follow the flash line, longitudinally, to follow the surface of the article, and pivotally to maintain the angle of incidence with the material at a desired value preferably 90°. A V-shaped groove is made in preference to a groove with parallel sides since it does not leave sharp corners which are apt to chip off. With a V-shaped groove, however, it is important that the depth of cut be controlled within close limits in order to prevent undesirable variations in the width of the groove at the surface. By means of cams, the cutter, during the movement of the handle therepast, is engaged with the diametrically opposite portions of the handle in succession and predeterminedly moved in accordance with the variable path of the flash line to cut grooves therealong. Means is provided for substantially stopping the movement of the handle at points where the path of the cutter has a substantial angle transverse to the plane of motion of the handle while cutting the vertical end portions of the flash lines. Mechanism is also provided for slightly moving the cutter, in addition to its main movements, in order to compensate for differences in contour in a vertical plane along the peripheral portions of the handle to be grooved, whereby grooves of substantially constant width and depth are obtained. This mechanism includes a limiting or depth gauge finger which rides on the surface of the handle at one side of the flash lines, the finger being vertical during the grooving of the intermediate horizontal portions of the flash lines and being rotated either to the right or left from its vertical position to a substantially horizontal position during the grooving of the vertical end portions of the flash lines, the mechanism comprising a sliding plate device which translates the rotary motion of the cutter unit into depth gauge finger rotation.

Other features and advantages of this invention will more fully appear from the following detailed description, taken in connection with the accompanying drawings, in which Fig. 1 is a schematic illustration of an engraving machine embodying the features of the invention as applied to the removal of the overflow material occurring along diametrically opposite surfaces of phenol plastic molded telephone handset handles. For the sake of clearness, the frame work and most of the bearings have been omitted from the drawings;

Fig. 2 is an enlarged side view, partly in section, of a portion of Fig. 1 showing the cutter and motor unit;

Fig. 3 is an end view, partly in section, taken on the line 3—3 of Fig. 2;

Fig. 4 is an enlarged vertical detail section of a portion of Fig. 1;

Fig. 5 is a plan view, on a reduced scale, taken on the line 5—5 of Fig. 2 showing the gauge finger rotating mechanism;

Fig. 6 is a fragmentary enlarged plan view of the cam operated gear ratchet drive for the handle shown in Fig. 1;

Fig. 7 is a vertical section taken on the line 7—7 of Fig. 6;

Figs. 8 and 9 are side and plan views, respectively, of a telephone handset handle as it comes from the molding dies, the overflow material occurring at diametrically opposite sides of the handle and which this machine is adapted to automatically remove by engraving a V-shaped groove therealong, the overflow material being partly removed along one side of Fig. 9 and a groove being shown where the overflow material has been removed;

Fig. 10 is an enlarged vertical section taken on the line 10—10 of Fig. 8 with the compensating and grooving mechanisms, shown fragmentarily in operative relation with a longitudinal peripheral portion of the handle, and Fig. 11 is a fragmentary plan view, partly in section taken on the line 11—11 of Fig. 8 of the right end of the handle with the compensating and grooving mechanisms, shown fragmentarily, in operative relation with a vertical end portion of the handle.

*Drive for article and cutter*

Referring now to the drawings, particularly Fig. 1, a constant speed electric motor for driving the machine is indicated at 10. The motor shaft carries a worm 11 meshing with a worm gear 12 fixed to a vertical main driving shaft 13, which carries at its lower end a cam disk 14. A gear segment 17, pivoted at 18 and carrying a cam follower 19, continuously rides in a cam groove 20 of the disk 14. Thus, as the constant speed main driving shaft 13 and attached disk 14 rotate in the direction of the arrow, the gear segment 17 is given an oscillating motion. Meshing with the gear segment 17 are gears 23 and 24 which are operatively connected alternately to driven shafts 25 and 26, respectively, at predetermined periods in the cycle of the machine, by a ratchet drive mechanism 27, to be presently described, which transforms the oscillating motion of the gear segment into a unidirectional one and imparts this last motion to a telephone handset handle 28 to be grooved (Figs. 1, 8 and 9), the arrow below the handle (Fig. 1) indicating its direction of intermittent rotation at a variable speed.

At predetermined intervals in the cycle, to be more fully described hereinafter, it is desirable to vary the rate of speed of the driven shafts 25 and 26. The shape of the cam groove 20 of the disk 14 rotating with the driving shaft 13 is such that at predetermined intervals during the grooving of the handle 28 (Figs. 8 and 9), such intervals corresponding to peripheral flash line portions A of the handle which are at an appreciable angle with respect to the plane of motion of the handle, the cam follower 19, carried by the gear segment 17, will ride onto short dwell portions of the cam groove 20. During the dwell intervals substantially no angular movement of the segment takes place, which reduces the speed of the driven shafts 25 and 26 to what will be termed hereinafter "slow speed." The term "high speed" will be used to designate other predetermined intervals during the grooving of the handle, such intervals corresponding to peripheral flash line portions B of the handle between the spaced flash line portions A of each flash line and also portions C around the circular ends where no flash lines occur. The "high speed" intervals are effected by the cam follower riding onto other portions of the cam groove 20 displaced from the dwell portions thereof, whereby the gear segment 17 will be oscillated about its pivot 18 in one direction or the other at a desired speed. This oscillation of the gear segment 17, controlled by the displaced cam groove portions, it is obvious, effects the desired "high speed" rotation of the gears 23 and 24, and accordingly, of the driven shafts 25 and 26 of the ratchet drive mechanism 27. No attempt has been made in the drawings to show the exact configuration of the cam groove 20, since it will be apparent, from the above description, how it should be cut to produce the described movements.

The telephone handset handle 28 to be grooved (Figs. 8 and 9) is shown in Fig. 1 as mounted upon a supporting head or table 31, both shown in broken outline, the table being slidably and rotatably carried upon a suitable slideway (not shown) for movement in a single horizontal plane along a predetermined path. The handle 28 is secured to the head 31 by suitable chucking means which, for the sake of simplicity, has been omitted from the drawings, since it forms no part of this invention and is not considered necessary to a full understanding thereof. Fixed to the table 31 is an elongated slotted "mangle" type gear 32 which meshes with a gear 33 fixed to the shaft 25 of the ratchet drive mechanism 27. The gear 32 is guided during the driving thereof through the gear 33, by a headed pin 34 extending through the slot thereof and fixed to the slideway upon which the table 31 moves.

The ratchet drive mechanism 27 includes the driven shafts 25 and 26 upon which, during predetermined periods, are alternately freely rotatable the gears 23 and 24, respectively, the gears being out of mesh with each other at all times, as clearly shown in Figs. 6 and 7. Adjacent their lower ends the shafts 25 and 26 (Fig. 7) have fixed thereto gears 37 and 38, respectively, which are in mesh. The gears 23 and 24 are supported at their lower surfaces upon the gears 37 and 38. Pivotally secured to and carried in recesses 40 of the gears 23 and 24 are spring pressed ratchet pawls 41 arranged to enter ratchet notches 42 formed in the associated shafts 25 and 26. From the arrangement of the pawls 41, as shown in Fig. 6, it will be apparent that the gears 23 and 24 will impart motion to their respective shafts only for a particular direction of gear rotation. When either gear is rotating in a direction to cause the pawl carried thereby to drive its shaft the other gear is merely idly turning in the same direction upon its shaft, the pawl carried by the latter gear being idle. As shown in Figs. 1, 6 and 7, the mechanism is in position to start an operating cycle, the handset handle 28 being supported on the table 31 in position ready to be grooved with the longitudinal center line of the gear 32 passing through the axis of rotation of the gear 33, its direction of rotation being counterclockwise, as indicated by the arrow. The gear segment 17 has completed a clockwise oscillatory motion and is in position to begin its next movement in a counterclockwise direction, as indicated by the arrow thereon.

In this position of the mechanism, and assuming that the cam disk 14 is being rotated at a suitable constant speed counterclockwise, as indicated by the arrow thereon, the gear segment 17 will first move counterclockwise, due to the cam follower 19 riding in a particular portion of the cam groove 20, thus causing a clockwise rotation of the gears 23 and 24. Through the pawl 41 of the gear 23 the shaft 25 will be driven in a similar direction and likewise the gear 33, fixed to the shaft 25, the gear 33 meshing with the "mangle" type gear 32 effecting a counterclockwise rotation thereof, as well as the table 31 and handset handle 28. During this part of the cycle, wherein the gear segment 17 is moving counterclockwise, the gear 24 is moving freely without driving its shaft 26, since its ratchet pawl 41 is not in driving engagement with its notch 42. It will also be apparent that during this part of the cycle the gear 37, fixed to the shaft 25 is rotated clockwise and since it meshes with the gear 38 fixed to the shaft 26, the direction of rotation of the latter gear and shaft will be counterclockwise or in a reverse direction to that of the gear 24 carrying the pawl 41.

In the continued rotation of the disk 14, the movement of the gear segment 17 is reversed to a clockwise direction, due to the cam follower 19 riding in a particular portion of the cam groove 20, whereupon the gears 23 and 24 are rotated counterclockwise. Since the pawl 41 of the gear 24 is in driving position, its shaft 26 will also be driven counterclockwise and likewise the gear 38 fixed thereto. The gear 38 in mesh with the gear 37 fixed to the shaft 25 effects a clockwise rotation thereof, thus continuing the same direction of rotation of the shaft and that of the table 31 and handset handle 28, indicated by the counterclockwise movement of the gear segment 17. During this latter clockwise movement of the gear segment 17, in which the gear 23 is rotating counterclockwise, it will be apparent that its ratchet pawl 41 is idle. Thus, regardless of the direction of movement of the gear segment 17, the ratchet drive mechanism 27 transforms the oscillating motion of the gear segment into a unidirectional one for the handle 28 and by means of the contour of the cam groove 20 at a predetermined variable speed.

*Mechanism for moving cutter longitudinally*

A mechanism, which will be termed an "upper unit" and shown embraced within the bracket 46 (Fig. 1) includes a frame fragmentarily illustrated by spaced horizontal connecting and bearing bars 47 which, together with all the elements carried thereon, are mounted as a unit upon suitable slideways 48 for reciprocatory movement in a horizontal plane along lines parallel to the normal or average position of the axis of the cutting tool. Journaled in the right ends of the bars 47 is a driven cam carrying shaft 49, receiving its motion from the driven shaft 13 by a universal joint connection 50, the latter, it will be obvious, permitting the "upper unit" to be reciprocated in a horizontal plane, as mentioned above, during the continued rotation of the shaft 49. Journaled in the left ends of the bars 47 for vertical and rotary movement is a sleeve shaft 51, having rigidly attached at its lower end a horizontally extending plate 52 having formed in its lower surface a dovetail shaped slideway 53 in which is slidably carried an L-shaped bracket 54. Carried by a depending vertical arm of the bracket 54 is an air driven turbine motor unit 55, which constantly drives an end milling cutter 56 in the operation of the machine. The motor unit 55 is connected to a compressed air supply source (not shown) by a flexible connection 57.

A compression spring 58, surrounding a headed screw 59 and interposed between the vertical arm of the bracket 54 and a depending flange 60 attached to the plate 52 normally acts to slide the bracket 54 and the elements carried thereby forward. The screw 59 has a sliding fit in the flange 60 of the plate 52 and its head acts as a stop member to limit the forward movement of the slidable bracket 54, in the slideway 53 of the plate 52 when the motor unit 55 is in a normal or retracted position, as shown in Figs 1 and 2. The purpose of yieldably slidably mounting the motor unit 55 upon the reciprocably mounted "upper unit" will be described hereinafter.

In the operation of the machine, diametrically opposite molding flashes or fins 64, one being shown in the process of removal in Fig. 9, are cut from the sides of the handle, and V-shaped grooves 67, shown in broken lines in Fig. 9, are cut successively in the handle along the lines of the removed fins. Since the circular ends of the handle do not have to be grooved, the rotating cutter 56 is not in contact with the handle during the rotary movements of the circular ends past the cutter. In timed relation with the intermittent rotation and longitudinal movements of the handle during the grooving cycle, the "upper unit" is slid first slightly forward to contact the approaching fin 64 at one side of the handle and continues, in contact therewith, until the groove 67 is completely formed therealong, whereupon the "upper unit" is retracted to withdraw the cutter from the handle and remains withdrawn until the approaching fin 64 at the opposite side of the handle is in position to be cut. Upon completion of the grooving of the handle, the "upper unit" is slid slightly rearward, or to the right, to the position shown in Figs. 1 and 2, so that the rotating cutter 56 will be withdrawn from the handle during the removal or reloading operation. Further, it is necessary during the intermittent longitudinal movement of the handle 28 past the cutter 56, during which peripheral fin portions B, intermediate the vertical end fin portions A, (Figs. 8 and 9) are grooved and during which grooving the handle has been rotated 90° from its position during the removal or reloading operations, that the cutter be moved alternately inwardly and outwardly relative to the longitudinal axis of the handle in order to maintain the cutter in predetermined operative contact with the peripheral surface of the handle, which is of varying contour, so that a substantially uniform width and depth of cut will be formed therealong in accordance with its physical shape. Also, automatic means, to be described hereinafter, is provided for slightly moving the motor unit 55 and thereby the cutter 56 independently of and upon the "upper unit" to compensate for small irregularities in the physical shape of the handle from that desired along the portions being grooved and also to compensate for differences in curvature in a vertical plane therealong.

For effecting the described main reciprocatory movements of the "upper unit" the cam shaft 49 carries a cam 68 having a peripheral cam face upon which constantly rides a cam follower 69 mounted in a fixed support 70. In the operation of the machine one handle is completely grooved during each rotation of the main driving shaft 13 and, therefore, the cam 68 is provided with two substantially identical opposite cam face portions. Since the cam makes one revolution for each revolution of the handle 28, during which the handle is completely grooved, it will be apparent that each half of the cam will effect similar desired movements to the cutter 56 along the portions A and B of each half of the handle. A compression spring 71 is arranged to constantly urge the "upper unit" to the right to maintain the cam 68 at all times in contact with the follower 69.

*Mechanism for angularly adjusting cutter*

In order to maintain the cutter 56 at right angles to the surface of the handle 28 during the grooving thereof along the fin portions A and B (Figs. 8 and 9) while the handle is moving longitudinally, which is desirable in order to produce a substantially uniform groove 67 along each half of the handle, means is provided for turning the cutter 56 and the motor unit 55 as a unit about the longitudinal axis of the sleeve shaft 51 in accordance with the varying contour of the handle so that the cutter will constantly be positioned substantially at right angles to the surface being grooved, the point of the cutter being substantially coincident with the axis of the sleeve shaft.

The turning of the cutter 56, as above described, is controlled by a cam 74 which is fixed to the cam shaft 49, the cam being formed with a peripheral cam face. Constantly riding on the cam face is a follower 76 mounted on one end of a spring pulled lever 77 pivoted on the lower end of a stud shaft 78 fixed to the upper bearing bar 47. The opposite end of the lever 77 has formed thereon a gear segment 81 which meshes with a gear 82 fixed to the sleeve shaft 51. The cam 74, since it is carried on the shaft 49, is rotated in timed relation with the rotary and longitudinal movements of the handle 28 and the cam face is of such contour, being formed with two substantially identical cam face portions, that during the periods when the handle is moving longitudinally the motion imparted to the follower 76 riding on the cam face will be transmitted by means of the lever 77, gear segment 81 and gear 82 to the sleeve shaft 51, which will receive the necessary oscillatory movements for turning the bracket 54 and cutter 56 to maintain the cutter substantially at right angles to the surface being grooved.

*Mechanism for vertically adjusting cutter*

Since the handle 28, during the grooving operation, is moved in a single horizontal plane and the overflow material 64 to be removed therefrom constitutes a path in which the portions A vary substantially from the portions B, as clearly shown in Fig. 8, it is necessary that the cutter 56 be intermittently elevated and lowered in order that it may follow the variable path of the overflow material on the handle as it moves therepast.

For controlling the elevating and lowering of the cutter 56, as above described, a cam 83 is fixed to the cam shaft 49, which makes one revolution to one revolution of the handle 28. This cam has a peripheral cam face which is constantly engaged by a follower 85 mounted on one end of a spring pulled lever 88 pivoted on the upper end of the stud shaft 78. The opposite end of the lever 88 has formed thereon a gear segment 89 which meshes with a gear 90 freely surrounding the sleeve shaft 51 and suitably supported in a fixed horizontal plane. Fixed to and extending upwardly from the gear 90 is a sleeve having an annular cam face 91 abutting a similar cam face 92 on a sleeve 95 freely surrounding the shaft 51. At its upper end the sleeve shaft 51 is provided with a flange 96 which normally rests on the upper end of the sleeve 95 so that in an upward movement of the sleeve the shaft will also move therewith, the sleeve at all times being fixed from rotary motion by a stationary pin 97 slidably engaged in an elongated slot in the periphery of the sleeve. The cam face of the rotating cam 83 is of such contour, being formed with two substantially identical cam face portions, and the cam is so timed that during the periods when the handle 28 is being grooved along the portions A and B (Figs. 8 and 9) the motion imparted to the follower 85 riding on the cam face will be transmitted by means of the lever 88, gear segment 89, to the gear 90. Thus an intermittent rotary motion in alternate directions at suitable rates of speed is imparted to the gear 90 and through the cooperating annular cam faces 91 and 92 on the gear 90 and sleeve 95, respectively, the shaft 51, which is engaged by means of the flange 96 thereof with the upper end of the sleeve, is first raised and then lowered by gravity to cause suitable movements of the cutter 56 in an up and down direction to follow the path of the overflow material.

It will be noted that in the particular article to be grooved, as disclosed herein (Fig. 8), the vertical fin portions A at one end are longer than the portions A at the opposite end thereof. This necessitates a greater rise of the cutter when working on the longer fin portions A and it is to be understood that the contour of each identical cam face portion of the cam 83 is such that the desired movements of the cutter are effected.

The peripheral face of the gear 82 on the shaft 51 is of such width that it remains in operative engagement with the gear segment 81 during the raising and lowering of the shaft to position the cutter 56 as just described.

*Means for compensating the movement of cutter to cut a groove of substantially uniform width and depth*

Other means, previously mentioned, are provided for automatically effecting slight additional movements to the motor unit and thereby the cutter 56 independent of the movements effected by the cam 68 to compensate for slight variations from the desired physical shape of the handle.

These means are in addition to the main reciprocatory movements imparted to the motor unit 55 and thereby the cutter 56 during similar movements of the "upper unit" effected by the cam 68, described hereinbefore, so that the cutter will be maintained in predetermined operative contact with the peripheral surface of the handle 28 in accordance with an average or tolerable physical shape and thereby cut a groove 67 of substantially uniform width and depth therein while removing the molding flash or fin 64 therefrom.

These slight variations in the shape of the handles 28 are due to various causes, such as small differences in degrees of shrinkage or warpage, while cooling, after coming from the molding dies, or slight variations in the dimensions of different sets of dies, where more than one set of dies are used to produce the required output. The slight additional compensating movements of the cutter 56 are permitted by the yieldable slidable mounting of the motor unit 55 upon the plate 52, hereinbefore described, and cooperating limiting or depth gauge means, to be presently described, which rides upon the peripheral surface of the handle closely adjacent to one side of the cutter 56. The use of the foregoing means, generally described, for effecting small movements of the cutter to take care of slight variations from the desired average physical shape of the handle 28 makes it necessary to provide additional cooperating means for giving the limiting or depth gauge finger compensatory movement to allow for predetermined extreme differences in contour in a vertical plane which are encountered around the periphery of the handle. Unless these slight additional compensating movements of the cutter are effected a noticeable variation in the width of the groove 67 will occur if cut along a fixed average path controlled by the cam 68 alone.

The additional horizontal reciprocatory movements of the cutter 56 upon the "upper unit" in order to form a groove 67 of substantially uniform width and depth in the handles, as above described, are controlled by the following mechanism: Fixed to the driven cam shaft 49 is a cam 98 having a peripheral cam face formed with two substantially identical cam face portions to correspond with identical operations effected on opposite sides of the handle, upon which constantly rides a follower 102 mounted on one end of a spring pulled lever 103. The opposite end of this lever has internal helical gear teeth 104 (Fig. 4) engaged with similar teeth formed on the upper end of the non-rotary sleeve 95. The follower 102 is slidably mounted on a pin attached to the lever 103 whereby the follower will remain in constant engagement with the cam face during vertical movements of the shaft 51 controlled by the cam 83, during which movements the sleeve 95 is moved upwardly and downwardly and carries the lever 103 with it. Extending freely through the sleeve shaft 51 is a rod 105 which at its upper end projects through an apertured bracket 106 secured to the upper face of the lever 103. A nut 108 adjustably threaded onto the projecting upper end of the rod 105 and resting on the upper face of the bracket 106 is effective normally to support the rod in a desired vertical position upon the "upper unit."

The lower end of the rod 105 is operatively connected to the outer end of a horizontal arm of a bell crank lever 109 (Figs. 2 and 3) pivoted at 110 to ears on the horizontally slidable bracket 54 which supports the motor unit 55. The connection between the rod 105 and the arm is such that during vertical movements of the rod the lever 109 will move about its pivot 110, while permitting the arm to move longitudinally when the slidable bracket 54 is moved relative to the upper unit in a manner presently to be described. Attached by screws 111 to the left end face of the motor unit 55, as viewed in Fig. 2, is a flanged sleeve 112. Surrounding and longitudinally slidable as well as rotatable upon the sleeve 112 is a sleeve 113 formed with an annular channel 116. A vertical arm of the bell crank lever 109 is bifurcated and the lower ends of the furcations carry rollers 117 (Fig. 3) which ride in the channel 116 of the sleeve 113. Disposed directly above the cutter 56, with the parts in the position shown in Figs. 2 and 3, is a limiting or depth gauge finger 118 which is fixed to the sleeve 113 within a slot thereof. The depth gauge finger 118 is of such length and arrangement that when the cutter 56 is engaged with the periphery of the moving handle 28 the finger rides on the peripheral surface thereof closely adjacent the upper side of the path of the cutter and determines the depth of the grooves 67.

The sleeve 113 at its right end, as viewed in Fig. 2, wherein the motor unit 55 is shown in a normal position with the cutter 56 retracted from cutting relation with the handle 28, is slightly spaced as indicated at 119 from the flange of the sleeve 112. The space 119, which occurs at all times in varying degrees, provides for a limited longitudinal movement of the sleeve 113 with its attached finger 118 upon the motor unit 55. The purpose of rotatably mounting the sleeve 113, which carries the gauge finger 118, upon the sleeve 112 will be described hereinafter.

In Figs. 10 and 11 there are shown extreme differences in contour in a vertical plane which are encountered along the peripheral portions of the handle 28 while being grooved. The handle 28 is shown fragmentarily in vertical cross-section in Fig. 10 and substantially horizontal cross-section in Fig. 11. Fig. 10 represents a condition along one of the horizontal peripheral fin portions B midway between the vertical fin portions A and, therefore, the limiting or depth gauge finger 118 is vertically disposed, while Fig. 11 represents a condition along one of the vertical fin portions A (Fig. 8) and, therefore, the finger has been rotated approximately 45° by a rotary movement of the sleeve 113 by means to be presently described. In both cases the finger 118 is riding on the surface of the handle under the action of the yieldable slidable mounting (Fig. 2) of the motor unit 55 and the cutter 56 is cutting a symmetrical groove 67 of the desired dimensions. It will be apparent that within the range of movement of the motor unit 55, permitted by the yieldable slidable mounting, small differences in dimensions of the handle from the tolerable average in the surface along the path of the cutter 56, as shown in Figs. 10 and 11, will result in movements of the cutter varying with differences in dimensions and controlled by the limiting engagement of the finger with the handle, thereby producing a symmetrical groove 67 of the desired dimensions.

It is obvious that to cut substantially the same depth of groove under each of the conditions represented by Figs. 10 and 11, the limiting finger 118 must be back of the point of the cutter 56 in the condition disclosed in Fig. 10 and forward of the point of the cutter in Fig. 11. The space 119 hereinbefore described between the flange of the sleeve 112 and the adjacent end face of the sleeve 113 permits the movements of the finger 118 relative to the point of the cutter 56, as shown in Figs. 10 and 11. That is, the position of the finger 118, as a whole, must be capable of being given a movement with respect to the motor unit 55 and the cutter 56 in a direction parallel to the axis of the cutter.

Since the bell crank lever 109 is pivoted to the slidable bracket 54 at 110 and thereby at a point integral with or fixed relative to the motor unit 55 and cutter 56, it is obvious that any rotary motion of the lever will change the position of the finger relative to the motor unit and cutter. It is to be understood that any independent movement of the gauge finger 118 will not transmit any rotary motion to the bell crank lever 109, due to the latter being pivoted at 110 to the bracket 54.

The positive movements of the limiting finger 118 to position the finger relative to the motor unit 55 and cutter 56 during the cutting of the groove 67 in the handle 28 to compensate for extreme differences in vertical contour encountered around the periphery of the handle, as illustrated in Figs. 10 and 11, and described hereinbefore, are effected by the cam 98. At predetermined intervals during its rotation the cam 98 causes slight rotary motion in opposite directions, to be imparted to the spring pulled lever 103 carrying the follower 102. By means of the internal helical gear teeth 104 of the lever engaged with the similar teeth of the non-rotary sleeve 95 surrounding the sleeve shaft 51, vertical movements are imparted to the lever and through the attached bracket 106 engaging the nut 108 on the vertically movable rod 105 the latter is moved upwardly and downwardly, thus rocking the bell crank lever 109 about its pivot 110 on the yieldable slidable bracket 54, supporting the motor unit 55 and cutter 56, the lower end of the rod 105 being connected to the horizontal arm of the lever. It will be obvious that under the control of the cam 98 the gauge finger 118 is adjusted toward and from the point of the cutter 56 in a direction parallel to the axis of the cutter to allow for extreme differences in contour in a vertical plane occurring along the opposite peripheral portions of the handle 28 to be grooved. Thus the cutter 56 will be so limited in its movement toward the handle, at portions of its varying peripheral contour, in removing the molding flash or fin 64 therefrom, that a groove of substantially uniform width and depth will be formed therein. Briefly, therefore, it is seen that the cutter 56 has a program controlled vertical movement, a program controlled swinging movement, two program controlled longitudinal movements, a third type of automatic longitudinal movement controlled by the article itself through the gauge finger 118 riding thereon. The program controlled movements are, of course, predetermined substantially in accordance with the ideal desired shape and size of the molded article, while the gauge finger controlled movements are for taking care of variations from the ideal which occur in practice.

*Means for rotating gauge finger*

Since the gauge finger 118, carried on the rotatable sleeve 113, is vertical during the grooving of the horizontal portions B of the fins 64 and is riding on the peripheral surface of the handle above the path of the fin, in order to serve as a limiting or depth gauge, it is necessary to rotate the finger approximately 45° either clockwise or counterclockwise during the grooving of the substantially vertical end portions A of the fins 64 in order that the finger may still ride on the surface of the handle at the side of the path of the fin. If these rotary movements of the finger 118 did not take place, at the fin portions A, the finger would contact with the fin 64 or with portions of the groove 67 previously cut, depending on the particular vertical fin portion A being operated on. This, it will be apparent, would result in a defective groove 67 for the finger would not be riding on the surface of the handle at one side of the path of the fin which is necessary so that the finger 118 may function as a depth gauge in order that grooves 67 of substantially constant width and depth may be cut.

The rotation of the finger 118, as above described, is effected by rotating the sleeve 113 upon which the finger is carried in the following manner. Referring to Figs. 2, 3 and 5, an irregular shaped horizontal plate 125 arranged below the forward end of the motor unit 55 is slidably mounted for reciprocatory movement in a direction at right angles to the longitudinal axis of the cutter 56 when the motor unit 55 is in position to start an operating cycle, as shown in Figs. 1, 2 and 5. The plate 125 is slidable upon a pair of spaced pads 126, fixed to the frame of the machine (not shown).

Formed longitudinally in opposite long arms of the plate 125 are a pair of alined spaced slots 128 through which extend headed and shouldered pins 129 fixed to the pads 126, the slots and pins serving to guide the plate 125 in its reciprocatory movement. Also formed in the plate 125 is a slot 130 which extends at right angles to the former slots and is aligned with the longitudinal axis of the cutter 56 when the cutter is in a retracted position adjacent the circular end of the handle 28. Attached to the motor unit bracket 54 is a depending pin 133 which extends through the slot 130. Fixed to and depending from the sleeve 113 which is rotatable upon the sleeve 112 attached to the motor unit 55 is a pin 134 which also extends through the slot 130.

Referring to Figs. 2, 3, 5 and 11, particularly to Fig. 5, it will be assumed that during a cycle of the machine the handset handle 28 has been rotated counterclockwise from the full line position to the dotted line position to begin the grooving of one side of the handle. Also that in timed relation therewith, the motor unit 55, through the combined action of the cams 68 and 74, has been advanced and with it the cutter 56, shown fragmentarily, from the full line position thereof to the dotted line position wherein it is shown as contacting the lower end of the first vertical portion A of the flash line to be grooved and is disposed at right angles thereto. This is clearly illustrated in Fig. 11. This turning of the cutter is effected by an angular adjustment as a unit of the motor unit 55 and the cutter carried thereby about the axis of the sleeve shaft 51, in the manner previously described, the point of the cutter being substantially coincident with the axis of the sleeve shaft.

During the angular adjustment of the motor unit 55 the pin 133 fixed to the bracket 54 is likewise moved along an arc shaped path and since it extends through the slot 130 of the plate 125, the plate is slid upon the pads 126 along a rectilinear path to the dotted line position thereof. In this movement of the plate 125 the pin 134, which also extends through the slot 130 of the plate 125, is also moved along an arc-shaped path and since this latter pin is carried by the rotatable sleeve 113 carrying the depth or gauge finger 118 the sleeve and finger are rotated in a counterclockwise direction, as viewed in Fig. 3, so that the finger will bear against the surface of the handle at the side of the vertical path of the fin 64 along the portion A. The opposite vertical sides of the slot 130 are so formed as indicated at 135 in Fig. 3, as to provide workable clearances for the pin 125 as it is rotated in opposite directions about the axis of the sleeve 113. As the cutter 56 moves upwardly, following the vertical path of the fin portion A, under the action of the cam 83, and nears the horizontal fin portion B, the cam 74 acts to angularly adjust the motor unit 55 and finally returns the slidable plate 125 to the full line position shown in Fig. 5 in which position the finger 118 will be in its vertical position again. At the opposite end of the handle 28 when the horizontal fin portion B has been grooved the same movement of the finger 118 occurs except in a clockwise direction, as viewed in Fig. 3, during the grooving of the vertical fin portion A. On the opposite side of the handle 28 the same movements of the finger 118 occur as described above in connection with the grooving of the first side of the handle.

*Operating cycle*

It it believed, from the foregoing description of the improved automatic engraving machine disclosed as applied to the finishing of plastic molded telephone handset handles wherein the overflow material is removed by cutting continuous grooves in opposite sides of the handle, that the manner of intermittently revolving and longitudinally moving the handle in a single horizontal plane past a continuously rotating cutter which is predeterminedly moved in a plurality of directions so that it will follow the variable path of the overflow material and cut grooves of substantially constant width and depth thereat will be clearly apparent. However, it may be well to indicate, by way of summary, what such general operation involves.

It will be assumed, for the purpose of this general description, that for each revolution of the main driving shaft 13 the handle 28 receives one complete revolution, during which spaced continuous grooves 67 are cut therein by the cutter 56, at the completion of which the handle will be in its normal removal or reloading position. At the same time, the cam shaft 49 and the cams 68, 74, 83 and 96 carried thereby are driven at the same speed as the shaft 13 through the universal joint 50. The speed of the shaft 25 will vary between "high and low speeds" through the medium of the ratchet drive mechanism 27, controlled by the cam groove 20 of the disk 14, in the manner hereinbefore described. It is to be understood that when the shaft 25 is being driven at either "high or low speed" the handle 28 is likewise driven by the gear train 33 and 32. Also, it will be assumed that the cams 14, 68, 74, 83, 91, 92 and 93 have all been formed as well as adjusted relative to each other upon their respective shafts to time correctly the periodic movements to be effected thereby.

Beginning the cycle of operation with the continuously rotating cutter 56 retracted slightly from the peripheral surface of the handle 28 which has just been loaded onto the slidable and rotatable table 31, as shown in Figs. 1 and 2, and which is held stationary for a predetermined interval during the removal or reloading operation by a movement of the gear segment 17 under the control of the cam groove 20, of the disk 14 fixed to the constant speed main driving shaft 13, all in the manner previously described, the grooving of the handle immediately follows.

In the continued rotation of the shaft 13 the table 31 is first given a counterclockwise rotary movement of 90° and, consequently, the handle 28 carried thereon is given a similar movement. In timed relation with this rotation of the handle the cams 68 and 74 effect an advancement of the motor unit 55 and thereby the cutter 56 into operative contact with the lower end of the vertical portion A of the fin 64 at the right end of the handle (Figs. 5 and 9). During the angular adjustment of the cutter 56, effected by the cam 74, to the position shown in Fig. 11, in order to maintain the cutter at right angles to the surface of the handle being grooved, the limiting finger 118 carried by the sleeve 113 is rotated approximately 45° in a counterclockwise direction (Fig. 3) from its initial vertical position to the position in Fig. 11, by the means previously described, which includes the pin 133 carried by the motor unit 55 and the sliding plate 125, so that the finger will ride on the surface of the handle at one side of the substantially vertical portion A of the fin 64. In timed relation with the engagement of the cutter 56 with the portion A of the fin 64 the cam 83 in the manner previously described causes the cutter to travel upwardly following the path of the fin 64 during which cutter movement the handle is substantially stopped or reduced to "slow speed" which is effected by the cam groove 20 and associated mechanism previously described. Thereafter the handle 28 is intermittently longitudinally moved and revolved counterclockwise past the cutter at "high speed" except at the vertical portions A of the pin 74 at which points it moves at "slow speed," the cutter 56 being predeterminedly moved during the complete rotation of the handle to cause it to follow the variable path of the continuous spaced fins 64 at opposite sides of the handle to remove them and form grooves 67 therealong which are of substantially constant width and depth.

In timed relation with the approach of each of the vertical fin portions A to the cutter, the cam 74 acts to angularly adjust the cutter in the manner previously described and simultaneously therewith the limiting finger 118 is rotated either counterclockwise or clockwise, as required, so that it will at all times ride on the surface of the handle at one side of the path of the groove 67 being formed, thus keeping the finger from coming in contact with the fin 64 or with portions of the groove previously cut. The cutter 56, as previously described, is in a retracted position through the action of the cam 68 during the rotary movements of the circular ends of the handle 28 past the cutter.

At the termination of one complete revolution of the table 31, the handle 28 is back at its normal position, as shown in Fig. 1, the table thereafter remaining stationary for a predetermined interval under the control of the cam groove 20 of the rotating disk 14, to permit the removal of the grooved handle from the table 31 and the mounting of a handle to be grooved thereon. As the table 31 comes to a halt, the cutter 56 is retracted from the grooved periphery of the handle, and the cycle of operations is completed.

It is evident from the herein detailed description, that a very practicable and efficient automatic engraving machine is provided whereby peripheral molding flash lines occurring along diametrically opposite sides of irregularly shaped plastic molded articles at the molding die parting line and following a variable path in a plurality of planes may be expeditiously and efficiently removed and continuous grooves of substantially constant width and depth formed therealong without marring the natural finish of the adjacent surfaces of the articles. Also, that by means of the compensating mechanism for positioning the cutter to take care of slight variations from an average or tolerable physical shape of the article, due to the various causes hereinbefore mentioned, and to extreme differences of contour in a vertical plane which are encountered along the sides of the article, grooves of maximum general uniformity may be formed in articles varying within limits from an average physical shape.

While the invention has been described with reference to a particular embodiment thereof for effecting the grooving of plastic molded telephone handset handles, it will be understood that it may be embodied in various forms, and is capable of other applications limited only by the scope of the appended claims.

What is claimed is:

1. In a machine for forming a groove following a path having portions extending at a substantial angle to each other in the surface of an article, a forming tool, means for relatively moving said tool and article, a gauge rotatable about the axis of the tool and riding on the article surface at the side of the tool operatively interconnected thereto to control the depth of the groove, and means for rotating the gauge in timed relation to the relative movement of the tool and article so that the gauge constantly rides on the article surface at the side of the tool.

2. In a machine for forming a groove following a path having portions extending at a substantial angle to each other in the surface of an article, a forming tool, means for relatively moving said tool and article at a variable speed whereby the groove is formed at a substantially constant speed, a gauge rotatable about the axis of the tool and movable in a rectilinear direction riding on the article surface at the side of the tool operatively interconnected thereto to control the depth of groove, and means for rotating and rectilinearly moving the gauge in timed relation to the relative movement of the tool and article so that the gauge constantly rides on the article surface at the side of the tool.

3. In a machine for forming a groove following a variable path in a plurality of planes and having portions extending at a substantial angle to each other in the surface of an article, a forming tool, means for relatively moving said tool and article to cause a traverse of the surface by the tool, means for effecting additional predetermined relative movements in a plurality of directions between the tool and article simultaneously with the first mentioned relative movement to form a groove following a variable path in a plurality of planes in the surface of the article, said latter means including means for bodily relatively angularly moving the tool and article to maintain the angle of incidence of the tool and the surface to be grooved at a desired value, a gauge rotatable about the axis of the tool and riding on the article surface at the side of the tool operatively interconnected thereto to control the depth of the groove, and means for relatively rotating the gauge and article in timed relation to the relative movements of the tool and article so that the gauge constantly rides on the article surface at the side of the tool.

4. In a machine for forming a groove following a variable path in a plurality of planes and having portions extending at substantial angles to each other in the surface of an article, a forming tool, means for moving the article past the tool at a variable speed whereby the variable path groove is formed at a substantially constant speed, means for moving the tool in a plurality of directions simultaneously with the movement of the article past the tool and in timed relation with the variable speed thereof to form a continuous groove following a variable path in a plurality of planes in the surface of the article, said tool moving means including means for bodily moving the tool angularly to maintain its angle of incidence with the surface to be grooved at a desired value, a rotatable and reciprocatory gauge riding on the surface of the article at the side of the tool operatively interconnected thereto to control the depth of the groove, and means for rotating the gauge in timed relation to the angular movements of the tool so that the gauge constantly rides on the surface of the article at the side of the tool.

5. In a machine for cutting a groove following a variable path in a plurality of planes and having portions extending at substantial angles to each other in the surface of an article, a cutting tool unit, means for moving the article past the cutting point of the tool at a variable speed whereby the variable path groove is cut at a substantially constant speed, means for moving the tool unit in a plurality of directions simultaneously with the movement of the article past the tool and in timed relation with the variable speed thereof to cause the tool to cut a continuous groove following a variable path in a plurality of planes in the surface of the article, said tool unit moving means including means for bodily moving the tool unit angularly about an axis coincident with the point of contact of the tool with the surface to be grooved to maintain its angle of incidence therewith at a desired value, a gauge riding on the surface of the article at one side of the tool point operatively interconnected thereto to control the depth of cut, and means operatively interconnecting the tool unit with the gauge responsive to angular movements of the tool unit for rotating the gauge so that it constantly rides on the surface of the article at said one side of the tool point.

CLARENCE E. McCOY.
OLIVER M. NIELSEN.
EDWARD OBERT.